Figure 1:
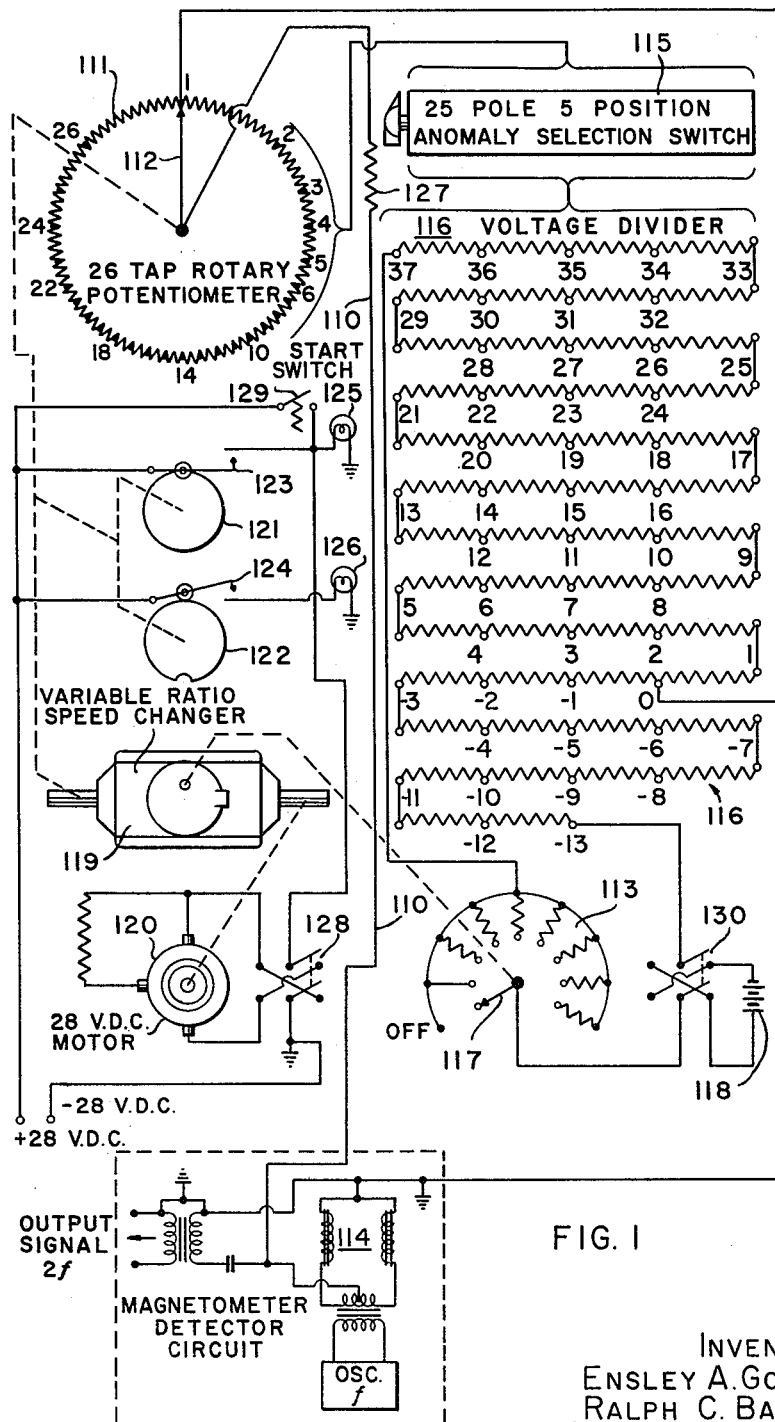

Jan. 26, 1965    E. A. GODBY ETAL    3,167,665
MAGNETIC ANOMALY SIMULATOR
Filed March 20, 1961    3 Sheets-Sheet 1

INVENTORS
ENSLEY A. GODBY
RALPH C. BAKER
BY Smart & Biggar
ATTORNEYS.

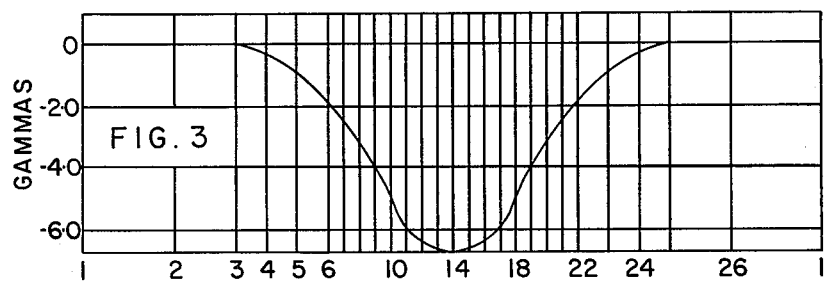
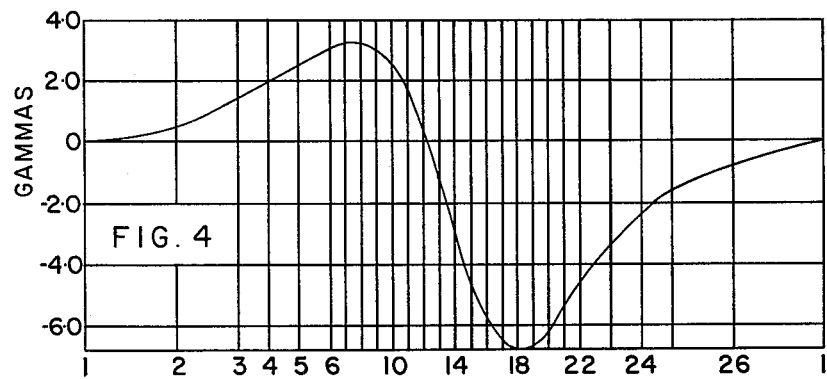
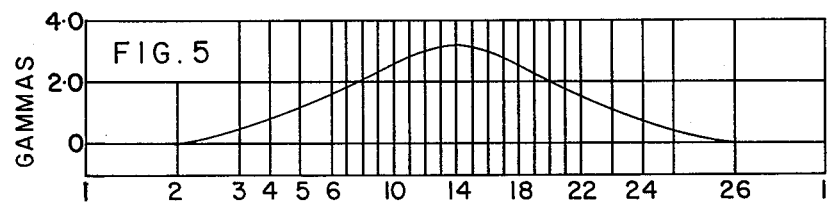
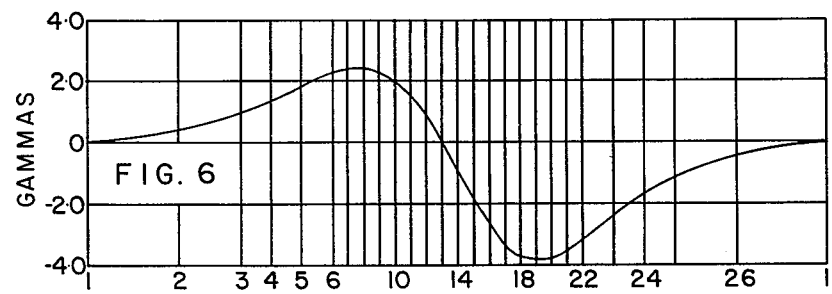
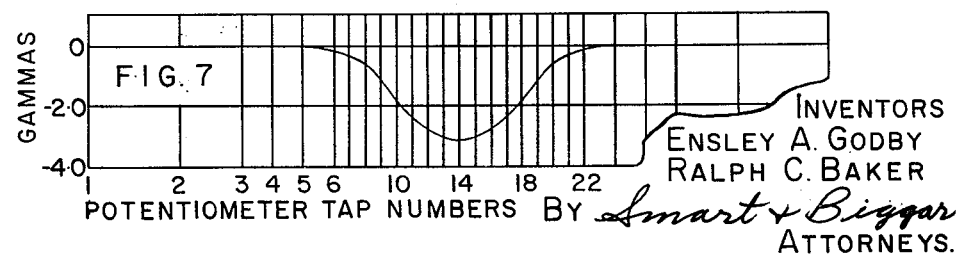
POTENTIOMETER TAP NUMBERS
INVENTORS
ENSLEY A. GODBY
RALPH C. BAKER

United States Patent Office

3,167,665
Patented Jan. 26, 1965

3,167,665
MAGNETIC ANOMALY SIMULATOR
Ensley A. Godby, Osgoode, Ontario, and Ralph C. Baker, Ottawa, Ontario, Canada, assignors to Her Majesty the Queen in the right of Canada as represented by the Minister of National Defence
Filed Mar. 20, 1961, Ser. No. 96,798
Claims priority, application Canada, May 12, 1960, 798,808
5 Claims. (Cl. 307—106)

The invention relates to a magnetic anomaly simulator for injecting typical magnetic anomaly signals, e.g. the magnetic anomaly signals caused by a submarine, into the magnetometer detector element of a magnetic detector system.

Magnetic detector systems are used in aircraft to detect submerged submarines by detecting the magnetic anomalies caused in the earth's magnetic field by the presence of a submarine. Although submarine anomalies provide only very small signals they have common characteristics which enable such small signals to be distinguished from noise. The effectiveness of the magnetic detector system depends on the ability of the operator to recognize the common characteristics of submarine anomaly signals in the presence of noise. This presents a serious difficulty because operators become proficient only through actual experience with the equipment.

Prior to the present invention it has been necessary to arrange exercises between a surface ship or a submarine and an aircraft to train operators to recognize anomaly signals. The cost of such exercises is extremely high and not always could the best conditions for training be obtained because of the great difficulty in establishing the geometrical relationship between the ship or the submarine and the aircraft required to produce the marginally recognizable signals which are of most use in training operators.

It has been suggested to train operators by re-running old charts of actual submarine anomalies but this method lacks realism in that the ambient noise is not real, i.e., it does not correspond to, and cannot be correlated with, the manoeuvering of the aircraft, etc. Also there remains the serious difficulty of obtaining charts having marginally recognizable signals.

The present invention provides a magnetic anomaly simulator which can inject typical submarine anomalies into a normally operating magnetic airborne detector. A magnetic anomaly simulator according to the invention comprises a source of direct current voltage, a voltage divider having a plurality of connections adapted to be connected across the source of direct current voltage; a rotary potentiometer having a continuous resistance element, a plurality of taps and a wiper; motor means adapted to rotate the wiper, means adapted to connect taps of the rotary potentiometer to connections of the voltage divider, and connections from the rotary potentiometer for supplying the output voltage from the wiper to the magnetometer detector element to simulate the detection of a magnetic anomaly. In preferred embodiments of the invention means is connected in series between the source of direct current voltage and the voltage divider for varying the potential differences between the connections of the voltage divider thus to vary the amplitude of the generated waveform. Also, variable ratio transmission means may be connected between the motor means and the wiper of the potentiometer so that the speed of rotation of the wiper can be varied to vary the period of the generated waveform.

Apparatus according to the invention injects typical submarine anomalies into a normally operating magnetic airborne detector to permit the training of operators while avoiding the disadvantages of the prior methods discussed above. The anomalies provided by apparatus according to the invention are superimposed upon real ambient noise, and full control is provided of the shape, amplitude and period of the waveform to allow simulation of various submarine to aircraft separations.

Figure 2:
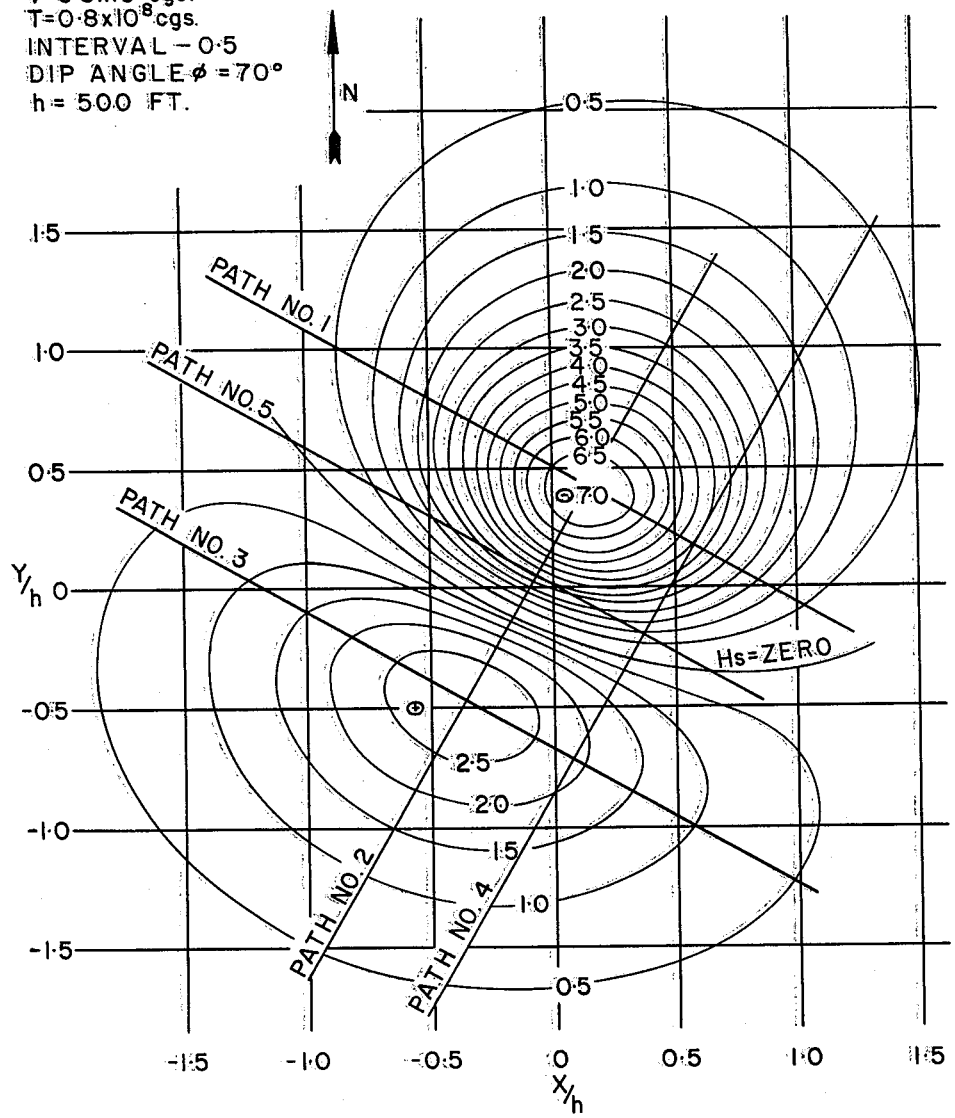

The invention will be described further with reference to the accompanying drawings, in which FIGURE 1 is a schematic circuit diagram of apparatus according to the invention, FIGURE 2 is a representative field pattern for a magnetic anomaly caused by a submarine, and FIGURES 3 to 7 show examples of waveforms generated in accordance with the invention for selected paths in FIGURE 2.

FIGURE 1 shows a schematic circuit diagram of a magnetic anomaly simulator according to the invention. The individual components of the simulator are well known to those skilled in the electronic arts and those components may be assembled into complete apparatus having a form appropriate to its purpose. In the present instance, the operation of the apparatus will be explained with reference to the simulation and detection of magnetic anomaly signals caused by a submarine.

The desired waveform of the simulated magnetic anomaly signal is obtained through connection 110 from a multi-tap rotary potentiometer 111 having taps numbered 1 to 26. The frequency of the signal is determined by the speed of the potentiometer wiper 112, and the amplitude of the signal is determined by amplitude control resistors 113. The resistance of the potentiometer between taps and the spacing of the taps in degrees may, for example, be as follows:

1–2; 26–1 _____ Each 12500 ohms and 45°.
2–3; 25–26 _____ Each 8330 ohms and 30°.
3–4; 4–5; 5–6; 22–23; 23–24; 24–25 _____ Each 4170 ohms and 15°.
6–7; 7–8; 8–9; 9–10; 10–11; 11–12; 12–13; 13–14; 14–15; 15–16; 16–17; 17–18; 18–19; 19–20; 20–21; 21–22 _____ Each 2080 ohms and 7.5°.

The output of the potentiometer 111 is injected into a magnetometer detector element 114 of a known form of magnetic detector system. The simulated anomaly is detected, modified by an amplifier (not shown) and bandpass filter (not shown) of the magnetic detector system and finally displayed in the conventional manner by a signal pen of the magnetic detector system. The effect of the signal amplifiers and the bandpass filter upon the simulated anomaly is identical to the effect these units have on a true anomaly, for example a submarine anomaly.

A 25 pole 5 position selector switch 115 is connected between the taps of the potentiometer 111 and the connections of a voltage divider 116 so that it can be used to change the connections between the taps of the potentiometer 111 and the connections of the voltage divider 116 thus permitting a choice of five waveshapes in the output simulated anomaly signal from the potentiometer 111 on the connection 110. A switch 117, by switching in different resistors 113 in series between the voltage divider 116 and a source of direct current voltage 118, controls the effective vertical separation between the submarine and the aircraft. The connections to the voltage source 118 are made through a polarity reversing switch 130. The switch 117, by means of a mechanical connection (indicated in dotted line) to a variable ratio speed changer 119, adjusts the speed of the potentiometer wiper 112 simultaneously with switching in different vertical separation resistors 113. The speed changer 119, as indicated by dotted lines is connected to drive the wiper 112 of the potentiometer 111 from a motor 120 as well as switch actuating cams 121 and 122 which control micro switches 123 and 124 respectively. The micro switch 123 controls a "signal on" lamp 125 while the micro switch 124 controls an "on top" (i.e., to indicate "on top" of the submarine) lamp 126.

The resistance network of the voltage divider may, for example, be composed of fifty 10 ohm resistors. The desired waveform of the simulated magnetic anomaly signal is built up on the taps of the 26 tap rotary potentiometer 111 by connecting appropriate terminals of the voltage divider 116 to corresponding taps on the potentiometer 111 through the anomaly selection switch 115. Each of the five positions of the switch 115 corresponds to a different waveform.

The waveform is generated as the wiper of 112 of the potentiometer 111 is rotated by the motor 120 which may be a 250 r.p.m. D.C. permanent magnet motor connected to the wiper 112 through the variable ratio speed changer 119 which permits the period of the wiper 112 to be varied from 5.9 seconds to 35.4 seconds. The "vertical separation" control (switch 117) adjusts the variable ratio speed changer 119 simultaneously with changes in value of the amplitude control resistors 113. The output waveform is available through an isolating resistor 127 of 688,000 ohms.

The table given below shows examples of the values of the period of the wiper 112 of the potentiometer, the ratio of the speed changer 119, the attenuation factor, the resistance and anomaly amplitude which corresponds to the vertical separations obtainable:

*Period, Amplitude and Vertical Separation of Anomalies*

| Vertical Separation, Feet | Period of Potentiometer Wiper, Seconds | Transmission Ratio | Attenuation Factor for Anomaly | Value of Amp. Control Resistor | Peak to Peak Value of Anomaly in Gammas | | | | |
|---|---|---|---|---|---|---|---|---|---|
| | | | | | 1 | 2 | 3 | 4 | 5 |
| 300 | 6.0 | 21:1 | 1.0 | 0.0 | 30 | 44 | 14 | 27 | 14 |
| 400 | 8.0 | 28:1 | 0.39 | 1,280 | 12 | 17 | 5.5 | 11 | 5.5 |
| 600 | 12.0 | 42:1 | 0.12 | 4,000 | 3.6 | 5.5 | 1.7 | 3.2 | 1.7 |
| 900 | 18.0 | 63:1 | 0.035 | 14,400 | 1.0 | 1.5 | 0.5 | 0.9 | 0.5 |
| 1,200 | 24.0 | 84:1 | 0.015 | 34,000 | 0.45 | 0.66 | 0.2 | 0.4 | 0.2 |
| 1,800 | 36.0 | 126:1 | 0.005 | 100,000 | 0.15 | 0.22 | 0.07 | 0.14 | 0.07 |

Anomaly numbers 1, 2, 3, 4 and 5 refer to the flight paths shown in FIGURE 2.

The values given for the period of the potentiometer wiper have been calculated assuming a true air speed of approximately 150 knots for all vertical separations.

Six vertical separations may be simulated, for example from 300 to 1800 feet, as set out in the above table. At each altitude five waveforms are available. A reversing switch 128 permits each waveform to be generated in either the forward or reverse direction, thus allowing simulation of flight in either direction along a given path over the submarine. Once the desired waveform, vertical separation and direction of flight path has been selected, the anomaly simulation is started by pressing a start switch 129 which is spring loaded to its "off" position. After one signal has been produced the simulator automatically stops.

It has been observed that although each of many flight paths over a submarine produced a different waveform there were only a few basic shapes. It was found that five basic shapes would be representative of all shapes likely to be encountered. All other waveforms could be approximated by varying the period, amplitude, polarity and direction of these five basic waveforms. One static anomaly field pattern is shown in FIGURE 2 with five flight paths which illustrate the following signals:

(*a*) The maximum peak to peak signal obtainable from a given submarine for a given altitude and location.
(*b*) The attenuation of this maximum signal by a small displacement of the flight path.
(*c*) The signal obtained from a flight path which crossed only the positive peak.
(*d*) The signal obtained from a flight path which crossed only the negative peak.
(*e*) The signal obtained on a path directly over the submarine in a direction at right angles to the path providing signal (*a*).

FIGURES 3 to 7 show the waveforms corresponding to the five flight paths shown in FIGURE 2. For a given flight path the waveform obtained is valid for all vertical separations provided the amplitude and frequency of the wave are scaled according to the following rules:

(1) Amplitude varies as the inverse cube of the vertical separation.
(2) Frequency varies as the inverse of vertical separation.

A simulator according to the invention can be used for preliminary training of operators on the ground and also can be used for more advanced training in an aircraft to train operators to distinguish small submarine anomalies from ambient noise without need of the presence of a real submarine.

What we claim as our invention is:

1. A magnetic anomaly simulator for use in a magnetic detector system having a magnetometer detector element, said simulator comprising a source of direct current voltage, a voltage divider having a plurality of connections adapted to be connected across said source of direct current voltage; a rotary potentiometer having a continuous resistance element, a plurality of taps and a wiper adapted to contact the continuous resistance element; variable ratio transmission means connected to said wiper, motor means driving said variable ratio transmission means so that said wiper can be rotated at variable speeds, means adapted to connect said taps of said rotary potentiometer to connections of said voltage divider, and connections from said rotary potentiometer for supplying the output voltage from said wiper to said magnetometer detector element, to simulate the detection of a magnetic anomaly.

2. A magnetic anomaly simulator according to claim 1 and including means connected in series between said source of direct current voltage and said voltage divider adapted to vary the potential differences between the connections of said voltage divider thus to vary the amplitude of the waveform generated, and means adapted to vary the ratio of said variable ratio transmission simultaneously with variation in the potential drop across said voltage divider.

3. A magnetic anomaly simulator according to claim 1, in which the means adapted to connect taps of said rotary potentiometer to connections of said voltage divider is a multi-position selector switch adapted to provide a different set of connections for each position of said selector switch.

4. A magnetic anomaly simulator according to claim 1 and including means connected in series between said source of direct current voltage and said voltage divider adapted to vary the potential differences between the connections of said voltage divider thus to vary the amplitude of the waveform generated, means adapted to vary the ratio of said variable ratio transmission simultaneously with variation in the potential drop across said voltage divider, and in which the means adapted to connect taps of said rotary potentiometer to connections of said voltage divider is a multi-position selector switch adapted to provide a different set of connections for each position of said selector switch.

5. A magnetic anomaly simulator for use in a magnetic detector system having a magnetometer detector element, said simulator comprising a source of direct current voltage, a voltage divider having a plurality of connections adapted to be connected across said source of direct current voltage, potential difference varying means connected in series between said source of direct current voltage and said voltage divider; a rotary potentiometer having a continuous resistance element, a plurality of taps and a wiper adapted to contact the continuous resistance element; variable ratio transmission means in driving connection with the wiper of said potentiometer, motor means driving said variable transmission so that said wiper can be rotated at variable speeds, means adapted to connect said taps of said rotary potentiometer to connections of said voltage divider, and connections from said rotary potentiometer for supplying the output voltage from said wiper to said magnetometer detector element, to simulate the detection of a magnetic anomaly, said potential difference varying means being adapted to vary the amplitude of the wave form thus generated.

References Cited in the file of this patent
UNITED STATES PATENTS

| | | |
|---|---|---|
| 2,556,242 | Van Mierlo | June 12, 1951 |
| 2,774,934 | Gitzendanner | Dec. 18, 1956 |
| 2,964,658 | Bocast | Dec. 13, 1960 |